May 22, 1951 — A. F. HICKMAN — 2,553,583
SPRING SUSPENSION FOR RAILROAD CARS
Filed Sept. 27, 1945 — 5 Sheets-Sheet 1

INVENTOR
Albert F. Hickman
BY Popp and Popp
ATTORNEYS

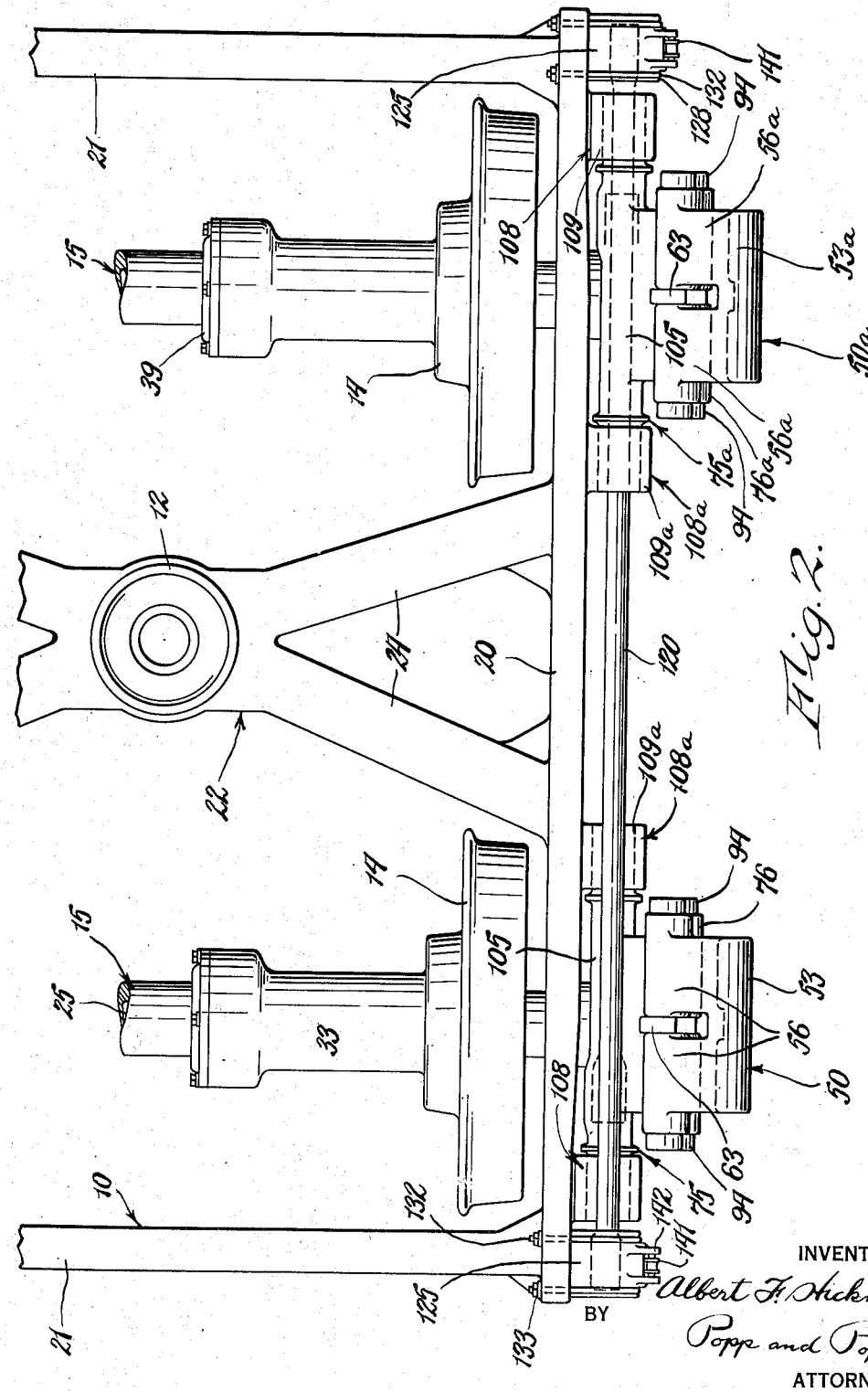

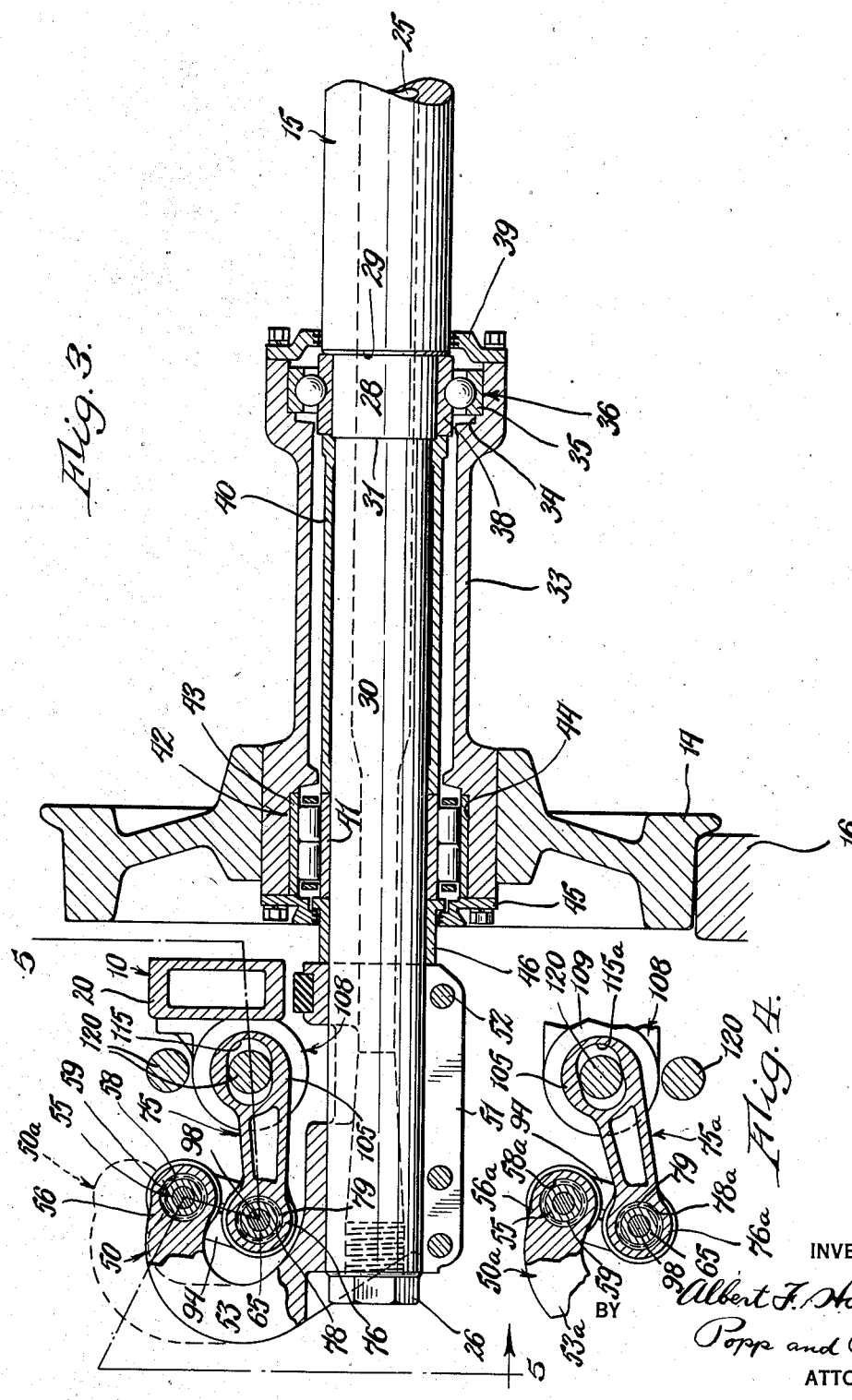

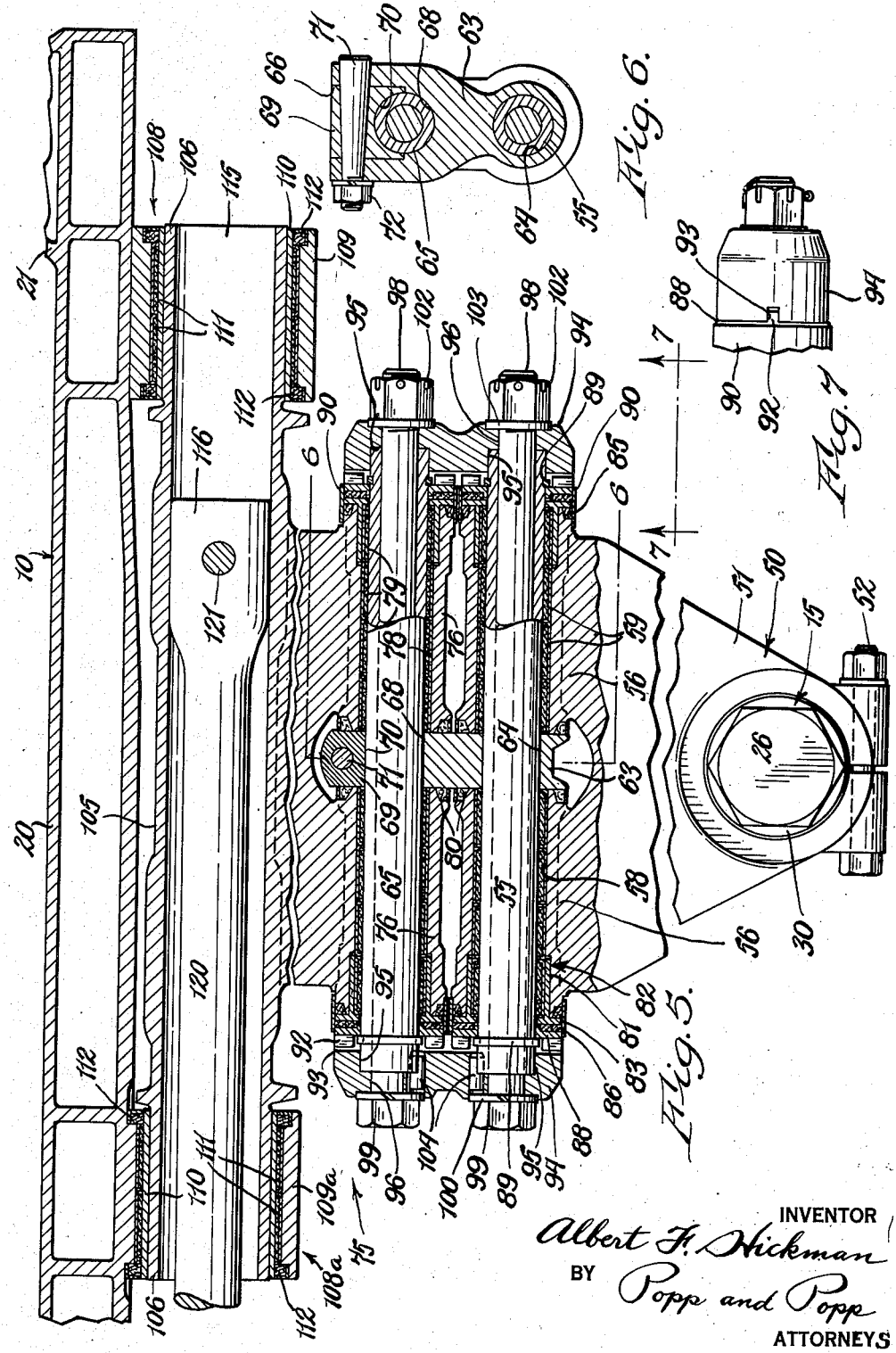

May 22, 1951  A. F. HICKMAN  2,553,583
SPRING SUSPENSION FOR RAILROAD CARS
Filed Sept. 27, 1945  5 Sheets-Sheet 5
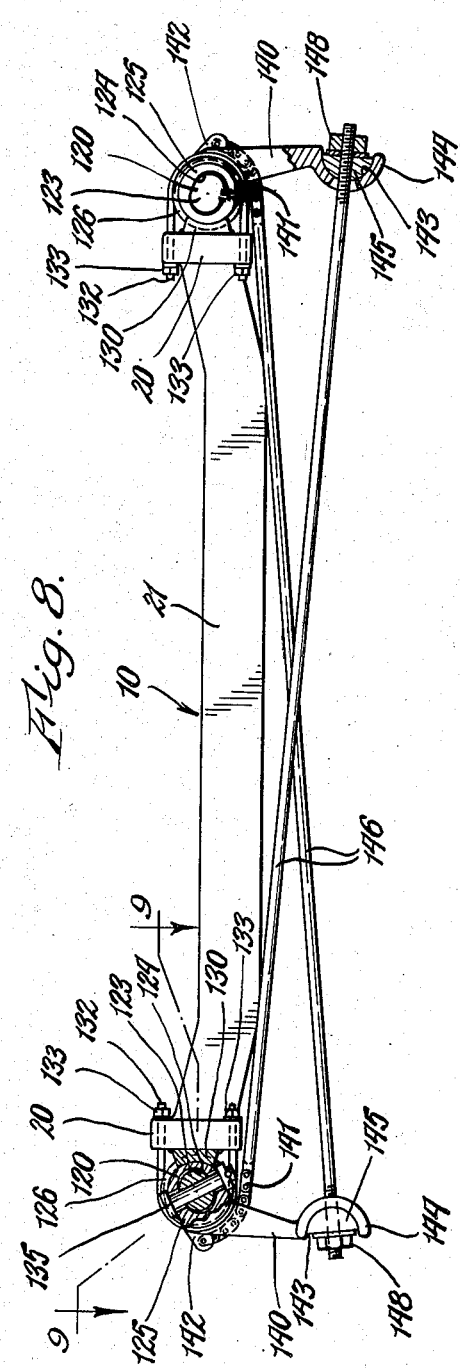
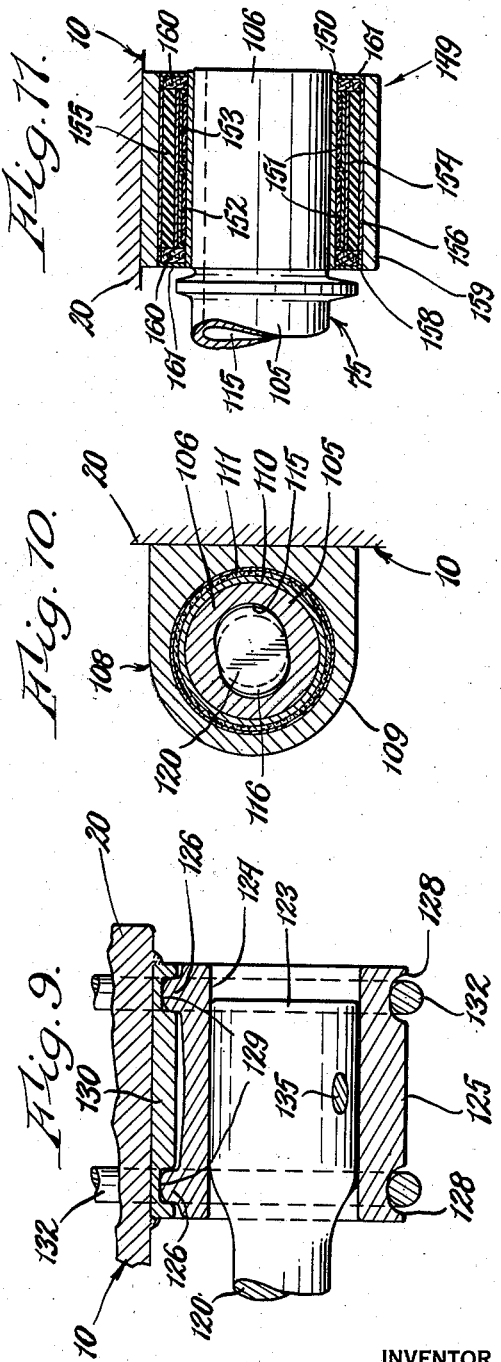
INVENTOR
Albert F. Hickman
BY
Popp and Popp
ATTORNEYS Patented May 22, 1951

2,553,583

UNITED STATES PATENT OFFICE 2,553,583

SPRING SUSPENSION FOR RAILROAD CARS

Albert F. Hickman, Eden, N. Y., assignor to Hickman Pneumatic Seat Co. Inc., Eden, N. Y., a corporation of New York Application September 27, 1945, Serial No. 618,917

14 Claims. (Cl. 105—182)

This invention relates to a spring suspension for railroad cars and more particularly to such a spring suspension particularly adapted for freight cars where speed of travel, safety, stability, economy and freedom from payload disturbance are of prime importance and where the suspension is subjected to a high percentage of load variation. Features of the invention are also, however, applicable to passenger car suspensions.

This application is a continuation-in-part of my copending application for patent for Spring Suspension for Railroad Cars, Ser. No. 374,515, filed January 15, 1941 now Patent No. 2,386,795, granted October 16, 1945.

A specific object of the present invention is to provide a torsion rod spring suspension for each end of each axle in which the torsion rods are horizontally disposed and which extend substantially the full length of the truck frame without interference with the linkage connecting the axles with the truck frame and without the use of auxiliary motion transmitting devices.

Another specific object of the present invention is to provide a linkage connecting each axle with the resilient resistance means which includes pivot pins and in which the pins are mounted and interconnected so that there is even load distribution on the bearings for the pivot pins so as to more adequately support the heavy load imposed thereon in freight car service.

A further specific object of the invention is to provide such heavy duty linkage in which each axle assembly can readily be removed from the truck.

Another specific object of the present invention is to provide a torsion rod suspension having a simplified connection between the live end of each torsion rod and the linkage connecting the corresponding end of the axle with the truck frame.

A further specific object of the present invention is to provide a simple and effective transfer of the end thrust upon the linkage connecting the axles with the truck frame through the torsion rods to the dead ends thereof.

A further specific object of the invention is to provide such a spring suspension, including axle brackets fast to projecting ends of the axle, in which the axle brackets cooperate to hold the parts of the main bearings for the wheels in position.

Another specific object of the invention is to provide a simplified means for rendering each torsion rod inoperative in the event of breakage of its companion torsion rod thereby to render the companion axle completely unsprung on both sides and to avoid danger of derailment.

Other objects and advantages will be readily apparent from the following description and drawings in which:

Fig. 2 is a fragmentary top plan view thereof.

Figs. 3 and 4 are enlarged, fragmentary vertical sections taken on the correspondingly numbered lines of Fig. 1.

Fig. 5 is a fragmentary laid out section of a torsion rod secured to the truck frame and the linkage connecting the live end of this torsion rod to the end of a corresponding axle, this section being taken generally on line 5—5, Fig. 3.

Fig. 6 is a fragmentary vertical sectional view, taken on line 6—6, Fig. 5.

Fig. 7 is a fragmentary side elevational view, taken from line 7—7, Fig. 5.

Fig. 8 is an end elevational view, partly in section, of the truck, this view being taken along line 8—8, Fig. 1.

Fig. 9 is an enlarged fragmentary horizontal section, taken generally on line 9—9, Fig. 8.

Fig. 10 is an enlarged, fragmentary vertical sectional view, taken on line 10—10, Fig. 1.

Fig. 11 is a section through a modified form of bearing used for anchoring the opposite ends of the crank arms on the frame of the vehicle, this modified form of bearing being particularly adapted to passenger cars.

Figure 1:
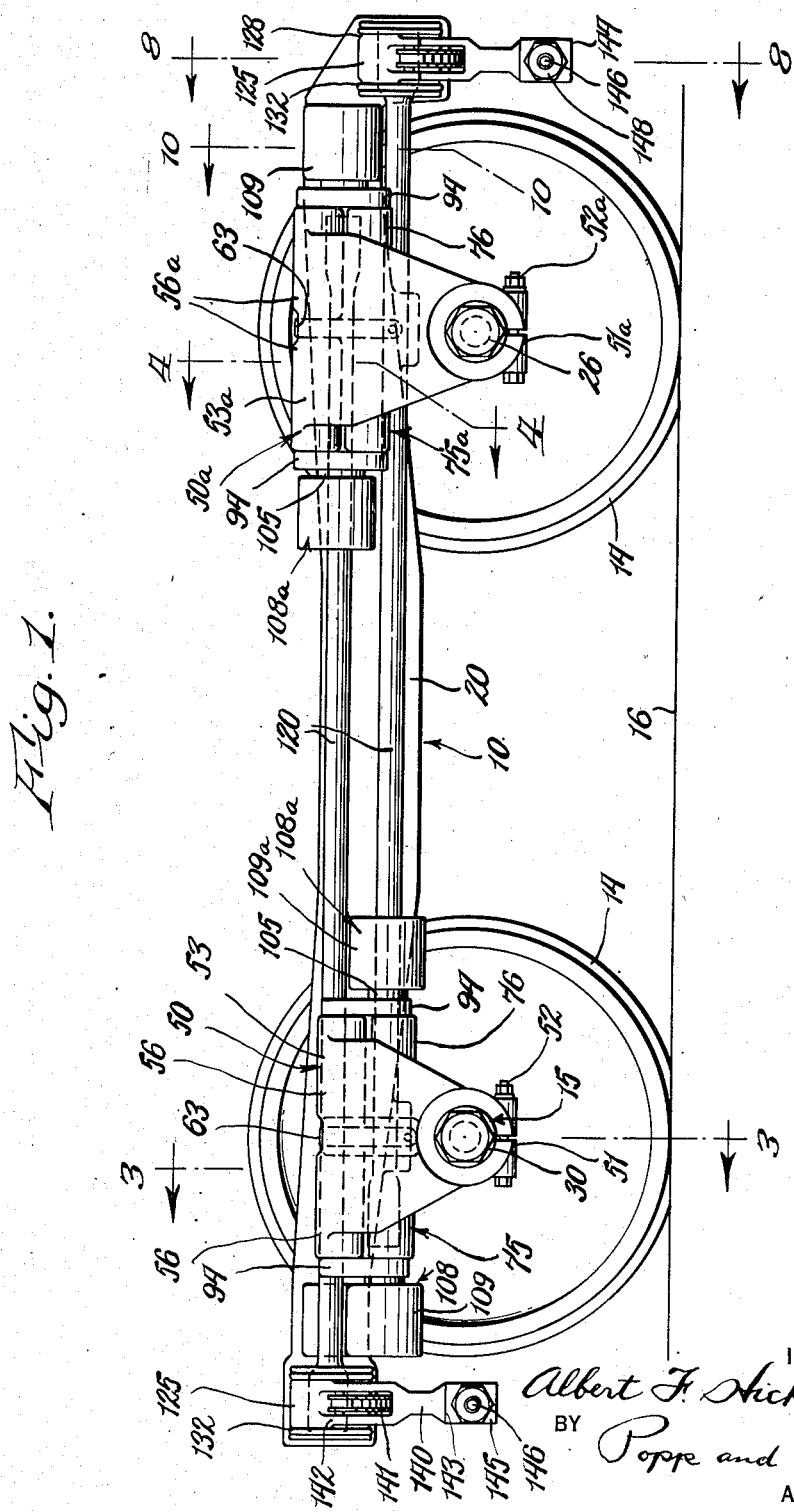
Fig. 1 is a side elevational view of a railroad truck supported by a torsion rod spring suspension embodying the present invention.

The invention is illustrated as supporting a swivel truck on the frame 10 of which the car body (not shown) is mounted by means of a center bearing 12. The truck frame 10 is shown as supported on four flanged railroad wheels 14 which are shown as journaled on axles 15 and ride upon the rails 16 of the railroad track. The freight car body (not shown) is supported at each end on a swivel truck as shown so that each truck supports half the weight of the car body. It will also be understood that while a four wheel truck is shown, the invention can also be embodied in a six wheel truck.

The truck frame 10 is shown as made of a single steel casting, although any suitable type of truck frame construction can be employed. The truck frame is shown as comprising two longitudinal side beams 20 which are box-shaped in cross section, these side beams each having a depressed central portion and upwardly inclining end portions which extend over each axle 15. These side beams 20 are rigidly connected at their ends by integral transverse end beams 21 and also by an integral center cross beam structure 22 which carries the center bearing 12. As best shown in Fig. 2, the center bearing portion of this center cross beam structure is connected with each longitudinal side beam 20 by a pair of beams 24 which diverge outwardly toward the longitudinal side beams 20.

The axles 15 are shown as being hollow, each axle having a bore 25 extending therethrough, these bores being closed at opposite ends of each axle by screw plugs 26. Each end of each axle is shown as having a reduced portion 28 providing an outwardly facing thrust shoulder 29 and a further reduced end 30 which extends through and beyond the corresponding railroad wheel 14 and provides an outwardly facing thrust shoulder 31.

Each wheel 14 is fast to an elongated tubular hub 33 which extends inwardly from the wheel and embraces the reduced portions 28 and 30 of the axle. At its inner end remote from the wheel 14, each hub 33 is provided with an enlarged bore 34 fitting the outer race 35 of a ball bearing 36, the inner race 38 of which is fitted on the reduced portion 28 of the axle and against the thrust shoulder 29 thereof. The adjacent end of the tubular hub 33 can be closed by a dust seal 39.

The inner race 38 of the ball bearing 36 is held against the shoulder 29 by a sleeve 40 which fits the adjacent part of the reduced end 30 of the axle and which bears at its opposite end against the inner race 41 of a roller bearing 42. The outer race 43 of this roller bearing 42 is fitted in a bore 44 at the outer end of the tubular hub 33. The adjacent end of the tubular hub 33 can be closed by a dust seal 45 which is shown as contacting a sleeve 46 on the axle, this sleeve bearing against the end of the inner race 41 of the roller bearing 42.

The numeral 50 represents an axle bracket secured to each projecting end of the axle 15 at one end of the truck and the numeral 50a represents an axle bracket secured to each projecting end of the axle 15 at the other end of the truck. Except for size these axle brackets 50, 50a are identical in construction and hence the same description is applied to both the numerals of the axle bracket 50a being distinguished by the suffix "a". Each axle bracket comprises a split tubular base or clamping portion 51 which embraces the end of the axle projecting beyond the adjacent railroad wheel 14 and bears against the end of the corresponding sleeve 46 so as to hold the railroad wheel 14 and its bearings in proper position on the axle. The split of this base or clamping portion 51 of each axle bracket is shown as extending vertically upwardly from its bottom lengthwise of the axle, and the sides of the split are shown as drawn together by a plurality of bolts 52 so as to firmly clamp the projecting end 30 of the axle therebetween. The extending part of the axle bracket is in the form of a gooseneck 53, this extending part extending outwardly and upwardly from the axle and its extreme upper end curving inwardly and downwardly, as best shown in Fig. 3, and supporting a tubular axle pivot pin 55 which is journaled at its extreme end.

As best shown in Fig. 5, this extreme depressed end of the axle bracket 50 is bifurcated to provide two spaced arms or knuckles 56 having alining horizontal bores 58 extending transversely of the axle. A series of bearings 59 are arranged in end-to-end relation in each of these bores and journal the tubular axle pivot pin 55 which extends through the two alining bores 58 of each axle bracket and has its opposite ends projecting outwardly therefrom. While the bearings 59 can be of any form they are shown as composed of bearing material impregnated with a lubricant and enclosed within a cylindrical metal shell.

A feature of the invention resides in loading the axle pivot pin 55 at its projecting ends and also between the arms or knuckles 56 so as to avoid bending strains on the axle pivot pin and to obtain uniform distribution of the load upon the several bearings 59. To this end a central shackle or link 63 is provided which has its upper end fitted between the arms or knuckles 56 of the bifurcated axle bracket 50 and is provided with a bore 64 receiving the central part of the axle pivot pin 55, as best shown in Fig. 6. The lower end of this shackle 63 embraces the central part of a tubular crank arm pivot pin 65 and for this purpose is provided with a downwardly opening rectangular jaw 66 the inner end of which terminates in a half round groove 68 which fits the corresponding half of the crank arm pivot pin 65. A rectangular block 69 is fitted in the rectangular jaw 66 and has a half round groove 70 engaging the other half of the crank arm pivot pin 65. The crank arm pivot pin 65 is clamped between the block 69 and the groove 68 of the shackle 63 and to this end a bolt 71 having a tapered shank is arranged in a tapered bore extending through the sides of the jaw 66 and the block 69 and is provided at its small end with a nut 72.

The tubular crank arm pivot pins 65 are journaled at the free ends of crank arms 75, 75a, these crank arms being journaled on the side beams 20 of the truck frame as hereinafter described, to project generally horizontally outwardly therefrom. The crank arms 75 are associated with the axle brackets 50 and the crank arms 75a are associated with the axle brackets 50a. Except for a slight difference in length these crank arms are identical in construction and hence the same description is applied to both, the reference numerals applied to the crank arm 75a being distinguished by the suffix "a".

As best shown in Fig. 5 the free end of each crank arm is bifurcated to provide two spaced arms or knuckles 76 having alining horizontal bores 78 extending transversely of the axle. A series of bearings 79 are arranged in end-to-end relation in each of these bores and journal the tubular crank arm pivot pin 65 which extends through the two alining bores 78 and has its opposite ends projecting outwardly therefrom. While the bearings 79 can be of any form, they are shown as being identical to the bearings 59 and hence as composed of bearing material impregnated with a lubricant and enclosed within a cylindrical metal shell.

Each central shackle or link 63 thereby connects the central part of the corresponding tubular axle pivot pin 55 with the central part of the companion crank arm pivot pin 65 and has its opposite ends arranged between the knuckles or bifurcations 56 and 76 of the corresponding axle bracket 50 and crank arm 75, respectively. In order to protect the bearings 59 and 79 for each axle pivot pin 55 and crank arm pivot pin 65, suitable dust seals 80 are preferably provided around each of these pins and between each knuckle 56, 76 and the opposing side of the central shackle or link 63.

The outer end of each of the bores 58 and 78 is enlarged to receive the sleeve part 81 of a tubular thrust member 82, this tubular thrust member having an integral radially extending washer-like portion 83 which fits the periphery of the corresponding tubular pin 55 or 65 and also fits against the adjacent end face of the corresponding axle bracket 50 or crank arm 75. An annular dust seal 85 is shown as interposed between the outer extremity of the washer-like portion 83 of each tubular thrust member 82 and the opposing face of the axle bracket 50 or crank arm 75 and the opposite face of the washer-like portion of each tubular thrust member is engaged by an annular flat bearing 86 which can be of any suitable form and is shown as comprising a bearing material impregnated with a lubricant. The opposite face of the annular flat bearing 86 is engaged by a washer 88 which is also preferably formed with an annular shoulder surrounding its bore and engaging the bore of the annular flat bearing 86 to hold the same in centered relation. These parts of the thrust bearing at each end of each tubular pin 55, 65 are preferably held in position by a snap ring 89 set in an external annular groove provided at each end of each of these pins and these parts of each thrust bearing are also preferably protected by a tubular metal ring 90 which fits the peripheries of the washer 88, flat annular bearing 86, washer-like portion 83 of the tubular thrust bearing 82, and dust seal 85 and which also fits around a boss formed on the opposing end of the corresponding axle bracket 50 and crank 75.

Each washer 88 is provided with a pair of diametrically opposite lugs 92 which project axially and fit in notches 93 provided in the opposing faces of an end shackle or link 94. A pair of these end shackles or links 94 are provided for each pair of pins 55, 65, one at each end thereof. Each end of each of these links or shackles 94 is recessed, as indicated at 95, to receive the end of the corresponding tubular pin 55, 65 and concentric with each recess 95 is provided with a bore 96 for a bolt 98, the head 99 of which bears, through a lock washer 100, against one of the end shackles or links 94, and the castellated nut 102 of which bears, through a lock washer 103, against the opposite end shackle or link 94. Upon tightening the nuts 102 it will be seen that the end shackles or links 94 are drawn firmly into engagement with the tubular pins 55 and 65 so as to rotate therewith. Such rotation of the end shackles 94 with these tubular pins 55 and 65 can be insured by the provision of dowel pins 104 between one or both of the shackles 94 and the pins 55 and 65 as illustrated at the left of Fig. 5. It will further be seen that the lug and recess connection 92, 93 between the end shackles or links 94 and each washer 88 insures that these washers 88 rotate with these end links so that these washers rotate upon the lubricant impregnated thrust bearings 86 which serve to take the end thrust of the pins 55 and 65 relative to the axle bracket 50 and crank arm 75 respectively. It will further be seen that all bearings are adequately protected against the entrance of dust and dirt and that since they are impregnated with lubricant, they require little servicing.

As best shown in Fig. 5, each crank arm 75 has an integral tubular hub 105 of substantial length and provided with cylindrical ends 106 which are journaled in bearings indicated generally at 108 and 108a. These bearings are identical except that the cylindrical bearing housing 109 of the bearing 108 is removably secured to the corresponding longitudinal side beam 20 of the truck frame whereas the opposite cylindrical bearing housing 109a is integral with the corresponding longitudinal side beam of the truck frame. This is to permit removal of the crank arms from the truck frame. Each of these bearings 108, 108a is shown as including a metal sleeve 110 on the corresponding cylindrical end 106 of the crank arm and engaged by a pair of bearings 111. These bearings are shown as each comprising a bearing material impregnated with lubricant and encased in a metal shell which is fitted in the bore of the bearing housing. The ends of this bore of each bearing housing 109, 109a is shown as closed by a dust seal 112.

The bore 115 through the tubular hub 105 of each crank arm 75, 75a is shown as being oval and as receiving the enlarged ovalled end 116 of a horizontal torsion rod 120. This feature of the suspension is described in detail in my Patent No. 2,213,004, dated August 27, 1940 covering a torsion rod mounting. The enlarged ovalled end 116 is also shown as pinned, as indicated at 121, to the tubular hub 105 of each crank arm so that the end thrust imposed upon each crank arm 75, 75a is taken by its torsion rod 120.

As best shown in Fig. 1, the torsion rods 120 extend horizontally and parallel with one another and each extends from its crank arm 75, 75a to the opposite extremity of the truck frame where its dead end is anchored. In particular it will be noted that the torsion rods for each axle pass beyond the companion axle. This relation of the torsion rods, that is, having their dead ends extending beyond the companion axles and at the same time arranged in horizontal planes and parallel with one another is permitted by the slight difference in size of the axle brackets 50, 50a and the crank arms 75, 75a at the opposite ends of the truck, as hereinafter more fully described.

The dead end 123 of each torsion rod 120 is enlarged and ovalled as described in my said patent and is fitted in the ovalled bore 124 in the hub of an anchoring member 125, as best shown in Fig. 9. On one side of the hub each of these anchoring members 125 is provided with a pair of circumferential ridges 126 and on the opposite side with a pair of circumferential grooves 128. The ridges 126 of each anchoring member fit in a pair of grooves 129 provided in a plate 130 which is shown as welded to the corresponding longitudinal side beam 20 of the truck frame and the grooves 128 receive the bends of a pair of U-bolts 132 the legs of which extend through the corresponding longitudinal side beams 20 of the truck frame and are secured thereto by nuts 133.

The enlarged ovalled dead end 123 of each torsion rod 120 is pinned, as by the bolt 135, to its anchoring member and it will therefore be seen that the thrust from each torsion rod 120 is transmitted to its anchoring member 125, this thrust being transmitted to the corresponding anchoring plate 130 by the ridges 126 and grooves 129. At the same time each torsion rod 120 is capable of turning its anchoring member 125 about the axis of the torsion rod although the anchoring members 125 are normally held against turning. In the event of the breaking of any torsion rod 120, however, the companion torsion rod is rendered inoperative by freeing its anchoring member 125, thereby to prevent derailment of the corresponding axle. This is accomplished by means generally similar to the construction shown in my Patent No. 2,371,169, dated March 13, 1945, for spring suspension for railroad cars, to which reference is made for a more detailed description, the means shown in the present application being constructed as follows:

Each anchoring member 125 is provided with an integral depending crank arm 140 and the beads or flanges 126 form an arcuate track for a chain 141, one end of this chain being anchored in a lug 142 formed integrally with the anchoring member. The free end of each depending crank arm 140 is formed to provide an outwardly facing horizontal semicircular channel 143, the end of each crank arm being made hook-shaped for this purpose, as indicated at 144. In each channel 143 is fitted a semicylindrical block 145 and the threaded end of a tension rod 146 extends through each hook-shaped end 144 and semicylindrical block 145 and is provided with a nut 148 bearing against the outer face of the semicylindrical block 145. The fit of each rod 146 in the opening through the corresponding hook-shaped end 144 of the arm 140 is sufficiently loose to permit the semicylindrical block 145 to be effective as a bearing for the tension rod 146 in the channel 143. The opposite end of each of the tension rods is secured to the end of the chain 141 at the opposite end of the same axle with which the hook-shaped end is associated.

The modified form of bearing 149 shown in Fig. 11 is in substitution for the bearings 108, 108a where the suspension is used for supporting a passenger car. These bearings support the cylindrical ends 106 of the tubular hubs 105 of the crank arms 75, 75a and for use in passenger cars each cylindrical end 106 of these crank arms, as shown in Fig. 11, is provided with a bearing sleeve 150 engaged by a pair of bearings 151, each of these bearings being preferably in the form of a cylinder 152 of bearing material impregnated with a lubricant and having its periphery and ends encased in a metal shell 153. The two bearings 151 are shown as backed by a metal sleeve 154 which is in turn backed by a sleeve 155 of rubber or other soft, resilient plastic material, this being held in a cylindrical metal sleeve 156 which is in turn fitted in the cylindrical bore 158 of the bearing housing 159. Each bearing housing is secured to one of the longitudinal side beams 20 of the truck.

As a dust seal for the bearings shown in Fig. 11, a ring 160 of fibrous material is shown as having its periphery and outer end face encased by a metal ring 161 which is L-shaped in cross section and one of these rings is fitted in each end of the bore 156 so that the sealing ring 160 fits against the cylindrical end 106 of the crank arm hub 105 and also against the ends of the bearings 151, metal sleeves 154 and 156 and rubber sleeve 155. It will therefore be seen that adequate dust seals are provided for the bearings 149 and that the rubber sleeves 155 provide an additional resilience in passenger car service to improve the ride.

In the operation of the suspension, the upward movement of the end of any axle 15, together with its axle bracket 50 or 50a, effects, through the corresponding tubular axle pivot pin 55, an upward movement of the central shackle 63 and end shackles 94 which are under tension and slant upwardly and inwardly from the tubular crank arm pivot pin 65 to the tubular axle pivot pin 55, these tubular pins rotating in the lubricant impregnated bearings 59 and 79, respectively. This effects an upward movement of the free end of the corresponding crank arm 75 or 75a which crank arm is journaled on the corresponding longitudinal side beam of the truck frame by the bearings 108, 108a. This twists the ovaled live end 116 of the corresponding torsion rod 120, this ovaled live end 116 being fitted in the ovaled bore of the tubular hub of the crank arm, and the ovaled dead end 123 of this torsion rod being normally held against rotation by its anchoring member 125. It will be seen that the torsion rods 120 provide the resilient resistance to the assumed upward movement of any axle end, the opposite dead ends of these torsion rods being anchored in the truck frame.

With the suspension shown, it will be seen that the companion torsion rods 120 for any axle are twisted in opposite directions by the load and that the vertically extending lever arms 140 are so arranged as to be urged outwardly away from each other by the load imposed on these torsion rods. It will therefore be seen that if any torsion rod should break, the anchoring member 125 of its companion torsion rod for the same axle is instantly freed, through the corresponding tension rod 146 and chain 141, so as to offer no resistance to the turning of this companion torsion rod and hence to render it inoperative. This prevents lifting of the wheel associated with this companion torsion rod and possible derailment of the truck. At the same time the tension rod and chain connection between each companion pair of torsion rods does not effect any load transfer from one wheel to the other in normal service.

As with my said copending patent application, it will be seen that when the end of any axle is so forced upwardly relative to the truck frame (or vice versa when the truck frame is forced downwardly relative to the axle under the influence of momentum) the effective resilient opposing force of the corresponding torsion rod 120 increases at a geometric and not an arithmetic rate so as to provide variable resistance of the accelerated increase type during upward movement of each axle end relative to the truck frame and of the accelerated decrease type during downward movement of each axle end relative to the truck frame.

The provision of the shackles 63, 94 likewise permits independent lateral movement of the axles 15 relative to the truck frame and by the upward and inward slant of these shackles each axle tends to centralize itself and at the same time to provide lateral cushioning against endwise movement of the axles as well as to avoid wheel tramp as dicussed in greater detail in my said copending application. Also, as described in greater detail in my said copending application the arrangement of the linkage provides effective spring centers which are at least 25% of the track width outside of the wheels 14 to provide a marked increase in stability and to eliminate the need for anti-roll devices, such as torsion bar stabilizers and the like. The suspension also is non-bottoming due to the crank arms and shackles being capable of straightening out relative to each other, as discussed in my said copending application, and all brake and drive torque is resisted by the axle brackets, shackles, crank arms and their pivot pins. Also the means whereby resilience is effective does not involve frictional resistance and hence is non-energy absorbing in its action and the suspension is so designed that the torsion rods 120 are not subjected to stresses more than one-half their elastic limits so that there is little danger of these torsion rods breaking.

As previously indicated a feature of the invention resides in the fact that the torsion rods 120 are all horizontally disposed and parallel and extend substantially the full length of the truck frame without interference with the other parts of the suspension and without requiring the use of relays, relays being devices for transferring motion from one place, as from the hub 105 of each crank arm, to the live end of a torsion rod located remotely therefrom. This object is accomplished in the present suspension by the differential in size of the axle brackets 50, 50a and the crank arms 75, 75a at the opposite ends of the truck frame. Thus, as best illustrated by full and dotted lines in Fig. 3, and also in Fig. 1, the axle brackets 50a at one end of the truck frame are considerably higher than the axle brackets 50 at the opposite end of the truck frame. The torsion rods 120 for the axle brackets 50a are accordingly journaled at a higher level on the longitudinal side beams 20 of the truck frame so that the torsion rods 120 for the higher axle brackets 50a are arranged above and parallel with the torsion rods 120 for the axle bracket 50, these torsion rods all being horizontally disposed. At the same time it is desirable that the linkage and torsion rods for all the axle ends have substantially the same response and to this end the crank arms 75a associated with the higher axle brackets 50a are slightly longer than the crank arms 75 for the axle brackets 50 and normally incline downwardly and outwardly at a slightly greater angle. This differential in the normal angularity of the crank arms 75 and 75a will be apparent from a comparison of Figs. 3 and 4. It has been found that this slight differential in the length and angularity of the crank arms 75, 75a does not appreciably change the ride characteristics of the linkage at the opposite ends of the truck and at the same time fully compensates for the required differential in height between the axle brackets 50 and 50a.

It will also be noted that the axle brackets 50, 50a are clamped to the projecting ends of the axles in position to hold the sleeves 46 and 40 and inner races of the main bearings 36 and 42 in position thereby to hold the railroad wheels 14 in proper position on the axles 15. This positioning is primarily determined by the shoulders 29 on the axle and hence the adjustment of the axle brackets 50, 50a to maintain this adjustment is not critical, it being merely necessary to the axle brackets be butted up against the sleeves 46 to hold the inner races for the bearings 36 and 42 and the interposed sleeve 40 in proper position. Conversely, the wheels 14 can be readily removed from the axles 15 after removal of the axle brackets 50, 50a.

An important feature of the present invention resides in the provision of the central shackle 63 connecting the axle pivot pins 55 with the crank arm pivot pins 65 in addition to the end shackles 94 therebetween. Without the provision of these central shackles, the heavy loading upon the suspension would tend to bow the pivot pins 55, 65, the load thereby being imposed unevenly on the bearings 59, 79. By the provision of the central shackle 63 the length of the pivot pins 55, 65 is, in effect, reduced and hence an even loading of the bearings 59, 79 is insured. At the same time the construction of the central shackle 63 with its removable end block 69 permits the ready removal thereof.

The entire axle assembly can readily be removed by removing the tubular pivot pins 55, 65. Thus the end shackles 94 can readily be removed by removing the bolts 98. The central shackle 63 is readily loosened by loosening the tapered pin 71. The tubular pins 55, 65 can then be readily removed by removing the snap rings 89 at either end thereof. While the tubular pivot pins 55, 65 and the shanks of the bolts 98 therein are shown as separate members these could, of course, be integral if desired.

It will also be observed that the thrust, longitudinally of the track, from any axle, as from drive and brake torque reactions, is carried through the axle brackets 50, 50a, end thrust bearings of the tubular pivot pins 55, 65 and crank arms 75, 75a directly to the corresponding torsion rods 120 through the pins 121. This thrust is carried to the anchoring members 125 of these torsion rods through the pins 135. The necessity for heavy thrust bearings between the crank arms 75, 75a is thereby avoided and at the same time all brake and drive torque reactions are carried directly through the suspension without auxiliary rods or braces. It will also be noted that both the radial and thrust bearings for the pivot pins 55, 65 are of simple and rugged construction; are free from lubrication difficulties; and adequately protected against the entrance of dust and dirt.

It will also be seen that the construction of the lever arms 140 with their curved ends providing a direct bearing for the blocks 145 of the tension rods 146 provides a simplified construction of the means for rendering any torsion rod 120 inoperative if its companion torsion rod should break.

From the foregoing it will be seen that the present invention provides a torsion rod spring suspension in which all parts of the suspension are contained within a swivel truck and which produces the desirable ride characteristics for a freight car, especially at high speed, and at the same time provides the necessary stability. It will further be seen that the present invention provides a suspension which is light in weight and will function to provide improved ride characteristics with little attention or danger of breakdown.

I claim as my invention:

1. A spring suspension for carrying the body supporting frame of a railroad car, comprising a pair of spaced parallel axles arranged in substantially the same horizontal plane, a car wheel supporting each end of each of said axles, an axle bracket mounted on each end of each of said axles and having its upper end arranged outside of the vertical plane of the annular line of contact of the adjacent car wheel with its rail, a pair of horizontal torsion rods mounted one above the other on each side of said frame above said axles and extending transversely of said axles and each having one end arranged above the end of a corresponding axle and its other end extending beyond the corresponding end of the other axle, means anchoring said other end of each torsion rod to said frame at a point beyond said corresponding end of the other axle, a horizontal axle pivot pin mounted on the upper end of each axle bracket to extend transversely of said axles, the axis of one pivot pin on each side of said frame being arranged a greater distance above said horizontal plane of said axles than the axis of the other pivot pin on the same side of said frame, means operatively connecting the said one ends of the upper torsion rods to the higher of said axle pivot pins and means operatively connecting the said one ends of the lower torsion rods to the lower of said axle pivot pins.

2. A spring suspension for carrying the body supporting frame of a railroad car, comprising a pair of spaced axles arranged in substantially the same horizontal plane, a car wheel supporting each end of each of said axles, an axle bracket mounted on each end of each of said axles and having its upper end arranged outside of the vertical plane of the annular line of contact of the adjacent car wheel with its rail and the effective upper ends of the axle brackets for one axle being higher than the effective upper ends of the axle brackets for the other axle, a pair of torsion rods mounted one above the other on each side of said frame above said axles and extending transversely of said axles and each having its live end arranged above the end of a corresponding axle and its dead end extending beyond the corresponding end of the other axle, means anchoring said dead end of each torsion rod to said frame at a point beyond said corresponding end of the other axle, a relatively long crank arm secured to the live end of each of the upper torsion rods, a relatively short crank arm secured to the live end of each of the lower torsion rods, a tension shackle pivotally connecting each of said relatively long crank arms with the effective upper end of a corresponding one of said higher axle brackets, a shackle pivotally connecting each of said relatively short crank arms with the effective upper end of a corresponding one of said lower axle brackets, each of said shackles extending downwardly from its axle bracket to the corresponding crank arm, said crank arms, shackles and axle brackets permitting vertical and lateral movement of said axles relative to said frame and said vertical movement being yieldingly resisted by said torsion rods.

3. In a spring suspension for carrying the body supporting frame of a railroad car, an axle, a car wheel supporting one end of said axle, an axle bracket mounted on said one end of said axle and having its outer end arranged outside of the vertical plane of the annular line of contact of the adjacent car wheel with its rail, a crank arm journaled on said frame to swing about a generally horizontal axis extending transversely of said axle and extending generally horizontally outward with its free end arranged below said outer end of said axle bracket, a pair of spaced coaxial bearings carried by said free end of said crank arm with the axis thereof extending horizontally and transversely of said axle, a crank arm pivot pin journaled in said pair of bearings, a pair of spaced coaxial bearings carried by said outer end of said axle bracket with the axis thereof extending horizontally and transversely of said axle, an axle pivot pin journaled in said last pair of bearings, a central shackle connecting the part of said crank arm pivot pin intermediate said first pair of bearings with the part of said axle pivot pin intermediate said second pair of bearings, and end shackles connecting the opposite ends of said axle and crank arm pivot pins.

4. In a spring suspension for carrying the body supporting frame of a railroad car, an axle, a car wheel supporting one end of said axle, an axle bracket mounted on said one end of said axle and having its outer end arranged outside of the vertical plane of the annular line of contact of the adjacent car wheel with its rail, a crank arm journaled on said frame to swing about a horizontal axis extending transversely of said axle and extending generally horizontally outwardly with its free end arranged below said outer end of said axle bracket, a pair of spaced coaxial bearings carried by said free end of said crank arm with the axis thereof extending horizontally and transversely of said axle, a crank arm pivot pin journaled in said pair of bearings, a pair of spaced coaxial bearings carried by said outer end of said axle bracket with the axis thereof extending horizontally and transversely of said axle, an axle pivot pin journaled in said last pair of bearings, a central tension shackle connecting the part of said crank arm pivot pin intermediate said first pair of bearings with the part of said axle pivot pin intermediate said second pair of bearings, end tension shackles connecting the opposite ends of said axle and crank arm pivot pins, said crank arm, shackles and axle bracket permitting vertical and lateral movement of said axle relative to said frame, and means anchored on said frame and yieldingly resisting movement of said crank arm to resist vertical and lateral movement of said axle relative to said frame.

5. In a spring suspension for carrying the body supporting frame of a railroad car, an axle, a car wheel supporting one end of said axle, an axle bracket mounted on said one end of said axle and having its outer end bifurcated to provide a pair of horizontal knuckles spaced transversely of the axle and arranged outside of the vertical plane of the annular line of contact of the adjacent car wheel with its rail, a crank arm journaled on said frame to swing about a horizontal axis extending transversely of said axle and extending horizontally outwardly with its free end bifurcated to provide a pair of horizontal knuckles spaced transversely of the axle and arranged below said outer end of said axle bracket, coaxial bearings carried by the knuckles of said crank arm with the axis thereof extending horizontally and transversely of said axle, a crank arm pivot pin journaled in said bearings, coaxial bearings carried by the knuckles of said axle bracket with the axis thereof extending horizontally and transversely of said axle, an axle pivot pin journaled in said last pair of bearings, a central shackle connecting the part of said crank arm pivot pin between said crank arm knuckles with the part of said axle pivot pin between said axle bracket knuckles, end shackles connecting the opposite ends of said axle and crank arm pivot pins, means anchored on said frame and yieldingly resisting movement of said crank arm, each of said shackles extending downwardly from said axle bracket to the corresponding crank arm, said crank arm, shackles and axle bracket permitting vertical and lateral movement of said axle relative to said frame.

6. In a spring suspension for carrying the body supporting frame of a railroad car, an axle, a car wheel supporting one end of said axle, an axle bracket mounted on said one end of said axle and having its outer end arranged outside of the vertical plane of the annular line of contact of the adjacent car wheel with its rail, a crank arm journaled on said frame to swing about a horizontal axis extending transversely of said axle and extending generally horizontally outwardly with its free end arranged below said outer end of said axle bracket, a pair of spaced coaxial bearings carried by said free end of said crank arm with the axis thereof extending horizontally and transversely of said axle, a crank arm pivot pin journaled in said pair of bearings, a pair of spaced coaxial bearings carried by said outer end of said axle bracket with the axis thereof extending horizontally and transversely of said axle, an axle pivot pin journaled in said last pair of bearings, a central tension shackle connecting the part of said crank arm pivot pin intermediate said first pair of bearings with the part of said axle pivot pin intermediate said second pair of bearings, end tension shackles connecting the opposite ends of said axle and crank arm pivot pins, said crank arm, shackles and axle bracket permitting vertical and lateral movement of said axle relative to said frame, and means anchored on said frame and yieldingly resisting movement of said crank arm to resist vertical and lateral movement of said axle relative to said frame, said central shackle comprising a link apertured at one end to receive one of said pins and bifurcated at its opposite end to fit the opposing side of the other of said pins, and a block removably secured in the bifurcated end of said link and holding said other of said pins in seated engagement with said link.

7. In a spring suspension for carrying the body supporting frame of a railroad car, an axle, a car wheel supporting one end of said axle, an axle bracket mounted on said one end of said axle and having its outer end arranged outside of the vertical plane of the annular line of contact of the adjacent car wheel with its rail, a crank arm journaled on said frame to swing about a horizontal axis extending transversely of said axle and extending generally horizontally outwardly with its free end arranged below said outer end of said axle bracket, a pair of spaced coaxial bearings carried by said free end of said crank arm with the axis thereof extending horizontally and transversely of said axle, a crank arm pivot pin journaled in said pair of bearings, a pair of spaced coaxial bearings carried by said outer end of said axle bracket with the axis thereof extending horizontally and transversely of said axle, an axle pivot pin journaled in said last pair of bearings, a central tension shackle connecting the part of said crank arm pivot pin intermediate said first pair of bearings with the part of said axle pivot pin intermediate said second pair of bearings, end tension shackles connecting the opposite ends of said axle and crank arm pivot pins, said crank arm, shackles and axle bracket permitting vertical and lateral movement of said axle relative to said frame, and means anchored on said frame and yieldingly resisting movement of said crank arm to resist vertical and lateral movement of said axle relative to said frame, said central shackle comprising a link apertured at one end to receive one of said pins and bifurcated at its opposite end to fit the opposing side of the other of said pins, a block removably fitted in the bifurcated end of said link and engaging the other side of the other of said pins, and a tapered pin extending through the bifurcations of said link and said block and movable to clamp said other of said pins between said link and block.

8. In a spring suspension for carrying the body supporting frame of a railroad car, an axle, a car wheel supporting one end of said axle, an axle bracket rising from said one end of said axle and having its upper end arranged outside of the vertical plane of the annular line of contact of the adjacent car wheel with its rail, a crank arm comprising a tubular fulcrum portion and a free end portion, a pair of bearings fast to said frame and journaling the opposite ends of said fulcrum portion of said crank arm to swing about an axis arranged above said axle with said free end portion extending generally horizontally outwardly from said wheel to a position below the said upper end of said axle bracket, an axle pivot pin carried by said upper end of said axle bracket, a crank arm pivot pin carried by said free end portion of said crank arm, tension shackles extending upwardly from said crank arm pivot pin to said axle pivot pin and permitting vertical and lateral movement of said axle relative to said frame, a torsion rod arranged coaxial with said tubular fulcrum portion and having its free end secured therein intermediate said bearings to rotate therewith, and means securing the dead end of said torsion rod to said frame thereby to yieldingly resist movement of said crank arm.

9. In a spring suspension for carrying the body supporting frame of a railroad car, an axle, a car wheel supporting one end of said axle, an axle bracket mounted on said one end of said axle and having its outer end arranged outside of the plane of the annular line of contact of the adjacent car wheel with its rail, a crank arm comprising a fulcrum portion and a free end portion, radial bearing means fast to said frame and journaling said fulcrum portion on an axis extending horizontally and transversely of said axle with said free end extending generally horizontally outwardly to a position below the outer end of said axle bracket, said radial bearing means permitting movement of said crank arm along said axis, an axle pivot pin carried by said outer end of sid axle bracket on a generally horizontal axis extending transversely of said axle, a crank arm pivot pin carried by said free end portion of said crank arm and arranged generally parallel with said axle pivot pin, a pair of spaced shackles connecting said pivot pins and transmitting brake and drive torque reactions to said crank arm, a torsion rod arranged generally coaxial with the fulcrum portion of said crank arm, means securing the live end of said torsion rod to said fulcrum portion of said crank arm against relative turning and end movements whereby said brake and drive torque reactions are transmitted as end thrust to said torsion rod, and means anchoring the dead end of said torsion rod on said frame against both turning and end movements.

10. In a spring suspension for carrying the body supporting frame of a railroad car, an axle, a car wheel supporting one end of said axle, an axle bracket mounted on said one end of said axle and having its outer end arranged outside of the plane of the annular line of contact of the adjacent car wheel with its rail, a crank arm comprising a fulcrum portion and a free end portion, radial bearing means fast to said frame and journaling said fulcrum portion on an axis extending horizontally and transversely of said axle with said free end extending generally horizontally outwardly to a position below the outer end of said axle bracket, said radial bearing means permitting movement of said crank arm along said axis, an axle pivot pin carried by said outer end of said axle bracket on a generally horizontal axis extending transversely of said axle, a crank arm pivot pin carried by said free end portion of said crank arm and arranged generally parallel with said axle pivot pin, a pair of spaced shackles connecting said pivot pins and transmitting brake and drive torque reactions to said crank arm, a torsion rod arranged generally coaxial with the fulcrum portion of said crank arm, means securing the live end of said torsion rod to said fulcrum portion of said crank arm against relative turning and end movements whereby said brake and drive torque reactions are transmitted as end thrust to said torsion rod, and means anchoring the dead end of said torsion rod on said frame against both turning and end movements, comprising a socket member receiving the dead end of said torsion rod, means fixing said socket member to said frame and a cross pin extending through said socket member and the dead end of said torsion rod.

11. In a spring suspension for carrying the body supporting frame of a railroad car, an axle, a car wheel supporting one end of said axle, an axle bracket mounted on said one end of said axle and having its outer end arranged outside of the plane of the annular line of contact of the adjacent car wheel with its rail, a crank arm comprising a tubular fulcrum portion having an out-of-round through bore and a free end portion, radial bearing means fast to said frame and journaling said fulcrum portion with the axis of said bore extending horizontally and transversely of said axle and with said free end extending generally horizontally outwardly to a position below the outer end of said axle bracket, said radial bearing means permitting movement of said crank arm along said axis, an axle pivot pin carried by said outer end of said axle bracket on a generally horizontal axis extending transversely of said axle, a crank arm pivot pin carried by said free end portion of said crank arm and arranged generally parallel with said axle pivot pin, a pair of spaced shackles connecting said pivot pins and transmitting brake and drive torque reactions to said crank arm, a torsion rod having a coaxial out-of-round live end fitting in said bore, a pin extending through said fulcrum portion of said crank arm and said live end of said torsion rod whereby said brake and drive torque reactions are transmitted as end thrust to said torsion rod, and means anchoring the dead end of said torsion rod on said frame against both turning and end movements.

12. In a spring suspension for carrying the body supporting frame of a railroad car, an axle, a car wheel supporting one end of said axle, an axle bracket mounted on said one end of said axle to project upwardly therefrom and arranged outside of the vertical plane of the annular line of contact of the adjacent car wheel with its rail, a crank arm journaled on said frame to swing about a generally horizontal axis extending transversely of said axle and extending generally horizontally outwardly with its free end arranged adjacent said axle bracket, the upper end of said axle bracket and the free end of said crank arm being each bifurcated to provide a pair of knuckles and being each provided with a bore extending through said knuckles generally parallel with said axis, bearings fitted in each of said bores, a pivot pin extending through the bores of each pair of knuckles and journaled in the bearings therein, a central tension shackle connecting the parts of said pins between said knuckles and in closely spaced relation to said knuckles, end tension shackles connecting the opposite ends of said pins, thrust bearings between said end shackles and the adjacent parts of said knuckles, and means resiliently restraining rotation of said crank arm.

13. In a spring suspension for carrying the body supporting frame of a railroad car, a pivotal connection between a part having a bore and a pair of shackles, comprising bearings fitted in said bore, a pivot pin arranged in said bore and journaled in said bearings, said shackles connecting with the outer ends of said pin, and thrust bearings at each end of said pin, comprising a sleeve fitted in each outer end of said bore and having a radially outwardly extending thrust bearing face at its outer end, an annular washer-like thrust bearing seated against each of said faces, a washer seated against the outer face of each of said thrust bearings, and an interfitting lug and recess connection between each of said washers and the adjacent part of the corresponding shackle and compelling them to move in unison.

14. In a spring suspension for carrying the body supporting frame of a railroad car, a pivotal connectiong between a part having a bore and a pair of shackles, comprising bearings fitted in said bore, a pivot pin arranged in said bore and having an enlarged cylindrical central part journaled in said bearings and projecting outwardly from said bore and having threaded end extremities of reduced diameter, thrust bearings interposed between said end extremity of each pin and the face at the adjacent end of said bore, said shackles connecting with the outer ends of said pin and having sockets receiving said projecting enlarged central part of said pin and provided with bore through which said threaded end extremities of reduced diameter extend, and nuts on each of said threaded extremities of reduced diameter and holding said shackles against the enlarged central part of said pin.

ALBERT F. HICKMAN.

REFERENCES CITED

The following references are of record in the file of this patent:

UNITED STATES PATENTS

| Number | Name | Date |
| --- | --- | --- |
| 173,257 | Beach | Feb. 8, 1876 |
| 1,054,015 | McGahee | Feb. 25, 1913 |
| 1,179,060 | Williamson | Apr. 11, 1916 |
| 1,414,737 | Gulick | May 2, 1922 |
| 1,742,825 | Sanders et al. | Jan. 7, 1930 |
| 2,056,220 | Stout et al. | Oct. 6, 1936 |
| 2,166,769 | Rabe | July 18, 1939 |
| 2,277,978 | Horger | Mar. 31, 1942 |
| 2,371,169 | Hickman | Mar. 13, 1945 |
| 2,377,883 | Hickman | June 12, 1945 |